United States Patent
Lee et al.

(10) Patent No.: US 11,213,178 B2
(45) Date of Patent: Jan. 4, 2022

(54) VACUUM CLEANER WITH BATTERY MANAGEMENT SYSTEM

(71) Applicant: LG ELECTRONICS INC., Seoul (KR)

(72) Inventors: Changhoon Lee, Seoul (KR); Kuyoung Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 853 days.

(21) Appl. No.: 14/852,421

(22) Filed: Sep. 11, 2015

(65) Prior Publication Data

US 2016/0095488 A1    Apr. 7, 2016

(30) Foreign Application Priority Data

Oct. 1, 2014   (KR) .................. 10-2014-0132547

(51) Int. Cl.
*A47L 9/28*    (2006.01)
*H01M 10/46*   (2006.01)

(52) U.S. Cl.
CPC .......... *A47L 9/2884* (2013.01); *A47L 9/2831* (2013.01); *A47L 9/2842* (2013.01); *A47L 9/2878* (2013.01); *H01M 10/46* (2013.01)

(58) Field of Classification Search
CPC .... A47L 9/2889; A47L 9/2884; A47L 9/2878; A47L 9/2873; A47L 9/2831; A47L 9/2842; A47L 9/2868; H02J 2007/004; Y02B 40/82

See application file for complete search history.

(56) References Cited

U.S. PATENT DOCUMENTS

| 4,953,253 A | 9/1990 | Fukuda et al. |
| 5,381,584 A | 1/1995 | Jyoraku et al. |
| 6,307,358 B1 | 10/2001 | Conrad |
| 6,448,732 B1 * | 9/2002 | Block .................. A47L 9/2842 |
| | | 15/339 |
| 6,664,748 B2 | 12/2003 | Kushida et al. |
| 2002/0175646 A1 * | 11/2002 | Kushida ............... A47L 9/2805 |
| | | 318/268 |

(Continued)

FOREIGN PATENT DOCUMENTS

| CN | 101192686 | 6/2008 |
| CN | 201352719 | 11/2009 |

(Continued)

OTHER PUBLICATIONS

United States Office Action dated Mar. 1, 2018 issued in U.S. Appl. No. 14/852,359.

(Continued)

*Primary Examiner* — David Redding
(74) *Attorney, Agent, or Firm* — Ked & Associates, LLP

(57) ABSTRACT

A vacuum cleaner includes a cleaner main body including a suction motor for generating a suction force; a suction unit that is in communication with the cleaner main body and sucks air and dust; and a battery that supplies power to the suction motor. The vacuum cleaner also includes a battery management system (BMS) that detects a status of the battery; and a controller that controls an operation of the suction motor. If a voltage of the battery detected by the BMS reaches a changeable reference voltage, the controller stops the suction motor.

13 Claims, 7 Drawing Sheets

(56) References Cited

U.S. PATENT DOCUMENTS

| | | | |
|---|---|---|---|
| 2004/0088817 A1* | 5/2004 | Cochran | A47L 5/14 15/327.5 |
| 2008/0309289 A1 | 12/2008 | White et al. | |
| 2011/0252593 A1 | 10/2011 | Gehards | |
| 2012/0081074 A1 | 4/2012 | Cunanan et al. | |
| 2013/0082664 A1 | 4/2013 | Hiraoka et al. | |
| 2014/0245566 A1 | 9/2014 | Conrad | |
| 2014/0312813 A1 | 10/2014 | Murchie et al. | |
| 2015/0214757 A1* | 7/2015 | Zane | H02J 7/0021 320/107 |
| 2016/0064963 A1* | 3/2016 | Huang | H02J 7/0055 320/114 |
| 2016/0088992 A1 | 3/2016 | Lee et al. | |

FOREIGN PATENT DOCUMENTS

| | | | |
|---|---|---|---|
| CN | 102473971 | | 5/2012 |
| CN | 202405763 U | | 8/2012 |
| CN | 103178564 | | 6/2013 |
| CN | 103545885 | | 1/2014 |
| CN | 105455726 | | 4/2016 |
| EP | 0 320 878 | | 6/1989 |
| GB | 2 442 033 A | | 3/2008 |
| JP | H 05-095861 | | 4/1993 |
| JP | 2001-224544 | | 8/2001 |
| JP | 2003-135341 | | 5/2003 |
| JP | 2004-057367 A | | 2/2004 |
| JP | 2004-213400 A | | 7/2004 |
| JP | 2006-141596 | | 6/2006 |
| JP | 3952361 | | 8/2007 |
| JP | 2011-250970 | | 12/2011 |
| JP | 2013-230302 | | 11/2013 |
| JP | 2014136013 A * | 7/2014 | H02J 7/0047 |
| KR | 10-2001-0082640 | | 8/2001 |
| KR | 10-2006-0118796 A | | 11/2006 |
| WO | WO 2008/146985 | | 12/2008 |
| WO | WO 2013/161068 | | 10/2013 |
| WO | WO 2014/000794 A1 | | 1/2014 |

OTHER PUBLICATIONS

European Search Report dated Feb. 11, 2016 issued in Application No. 15187412.0.
European Search Report dated Mar. 7, 2016 issued in Application No. 15187442.7.
United States Office Action dated Jun. 13, 2017 issued in U.S. Appl. No. 14/852,359.
Chinese Office Action dated Apr. 25, 2018 issued in Application No. 2015-10531562.3.
United States Final Office Action dated Oct. 27, 2017 issued in U.S. Appl. No. 14/852,359.
Chinese Office Action dated Aug. 1, 2017 issued in Application No. 201510531438.7.
Chinese Office Action dated Aug. 1, 2017 issued in Application No. 201510531562.3.
United States Office Action dated Apr. 30, 2018 issued in co-pending related U.S. Appl. No. 14/852,331.
European Search Report dated Feb. 17, 2016 issued in Application No. 15187700.8.
U.S. Office Action dated Oct. 18, 2018 issued in U.S. Appl. No. 14/852,331.
Chinese Office Action dated Nov. 9, 2018 issued in CN Application No. 201510531562.3.
U.S. Appl. No. 14/852,331, filed Sep. 11, 2015.
U.S. Appl. No. 14/852,359, filed Sep. 11, 2015.

* cited by examiner

VACUUM CLEANER WITH BATTERY MANAGEMENT SYSTEM

CROSS-REFERENCE TO RELATED APPLICATION

This application claims priority under 35 U.S.C. § 119 and 35 U.S.C. § 365 to Korean Application No. 10-2014-0132547, filed in Korea on Oct. 1, 2014, whose entire disclosure is hereby incorporated by reference.

BACKGROUND

1. Field

The present disclosure relates to a vacuum cleaner.

2. Background

In general, vacuum cleaners are devices that suck air including dust by using a suction force generated by a suction motor mounted on an inside of a main body and then filter the dust in the inside of the main body. Such vacuum cleaners are classified into manual cleaners and robotic cleaners. Manual cleaners are cleaners that a user has to perform cleaning manually, and robotic cleaners are cleaners that perform cleaning automatically while traveling an area to be cleaned. The manual cleaners may be classified into canister type cleaners in which a main body and a suction nozzle are separated from each other and are connected using a connection tube, and upright type cleaners in which a suction nozzle is combined with a main body.

Korean Unexamined Patent Application Publication No. 10-2006-0118796 (published on Nov. 24, 2006) is prior art literature that discloses a power cord outlet for a cleaner. In the disclosed prior art literature, a cord reel assembly is provided in a main body, and a power cord is connected to an outlet so that power may be supplied to the main body. In the prior art literature, since the cleaner receives power from the cord reel assembly, the cleaner may be moved by a length of a cord wound on the cord reel assembly when cleaning is performed using the cleaner. Thus, there is a limitation in performing cleaning and mobility based on the cord length.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
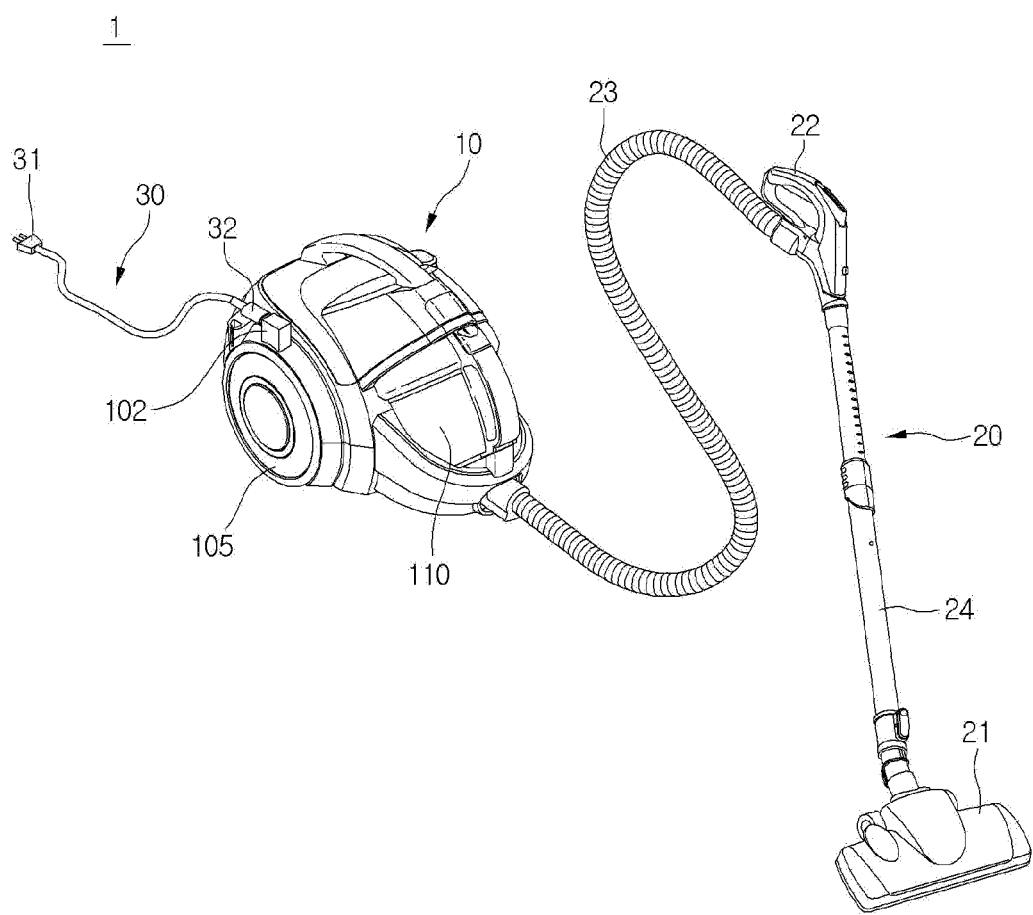
FIG. 1 is a perspective view of a vacuum cleaner according to an embodiment.
Figure 2:
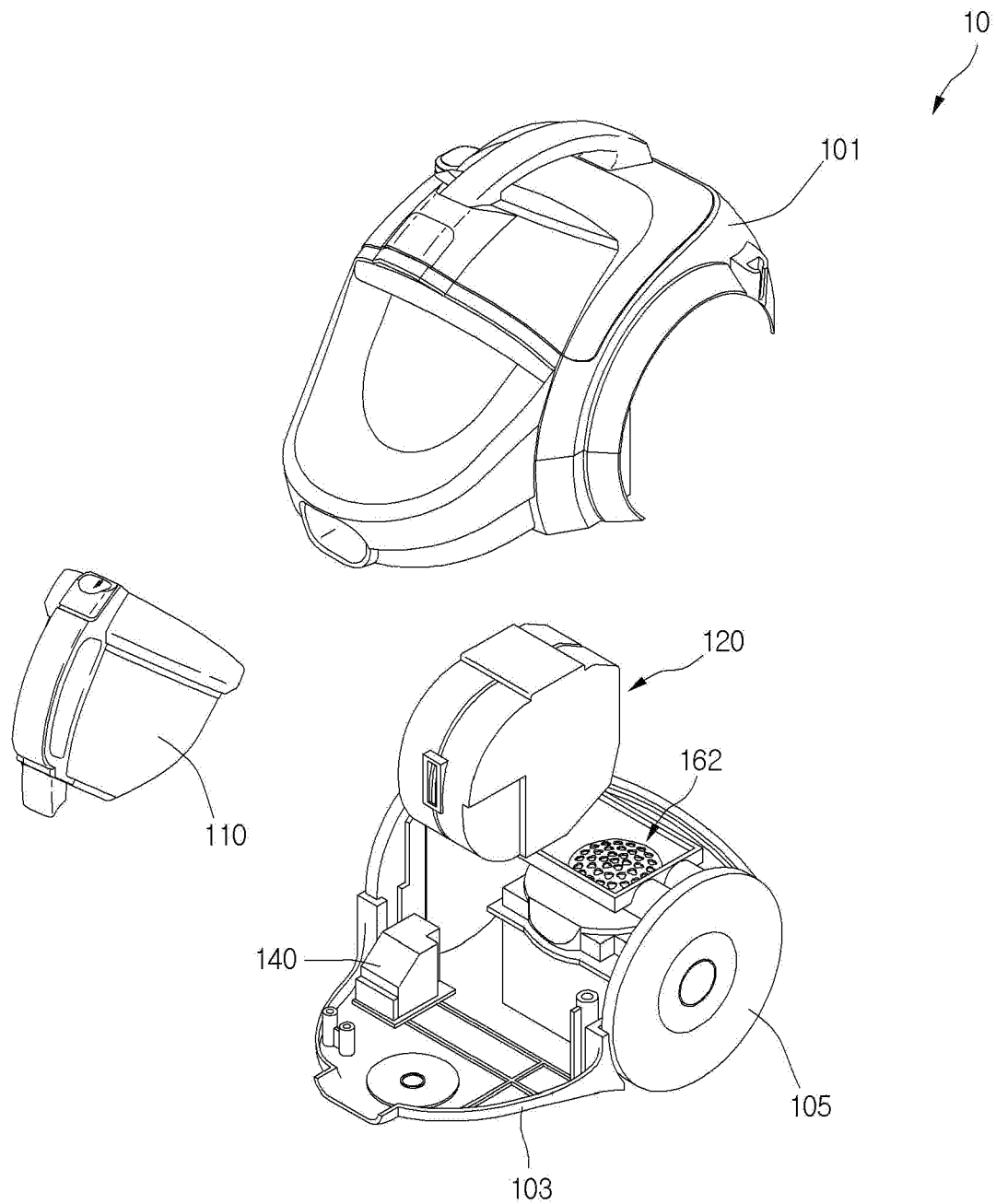
FIG. 2 is an exploded perspective view of a main body of the vacuum cleaner according to an embodiment.
Figure 3:
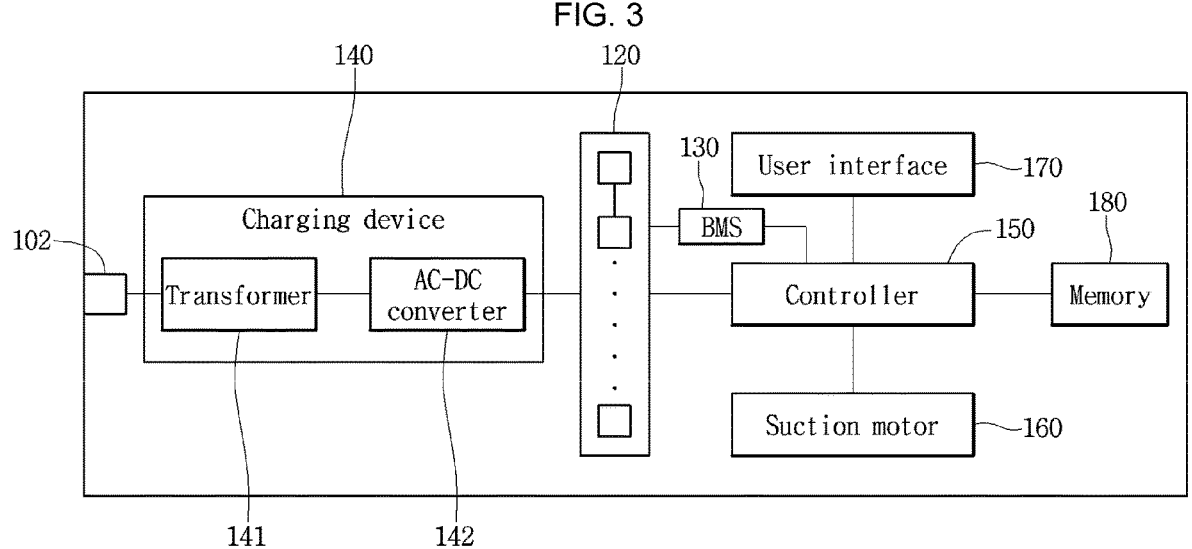
FIG. 3 is a block diagram of a configuration of the vacuum cleaner according to an embodiment.

FIG. 1 is a perspective view of a vacuum cleaner according to an embodiment, and FIG. 2 is an exploded perspective view of a main body of the vacuum cleaner according to an embodiment, and FIG. 3 is a block diagram of a configuration of the vacuum cleaner according to an embodiment. A vacuum cleaner 1 according to an embodiment may include a cleaner main body 10 including a suction motor 160 that generates a suction force, and a suction device 20 that guides air including dust toward the cleaner main body 10.

The suction device 20 may include a suction unit 21 for inhaling dust on a surface to be cleaned, for example, on a floor, and connection units 22, 23, and 24 for connecting the suction unit 21 to the cleaner main body 10. The connection units 22, 23, and 24 may include an extension tube 24 connected to the suction unit 21, a handle 22 connected to the extension tube 24, and a suction hose 23 that connects the handle 22 to the cleaner main body 10.

The vacuum cleaner 1 may further include a dust separation unit that separates air and dust sucked by the suction device 20 from each other, and a dust canister 110 that stores dust separated by the dust separation unit. The dust canister 110 may be separably mounted on the cleaner main body 10. The dust separation unit may be manufactured as an element separated from the dust canister 110 or may form one module with the dust canister 110.

The vacuum cleaner 1 may include a battery 120 to store electrical energy such that power for operating the suction motor 160 is provided, a charging device 140 for charging the battery 120, and a power cord 30 that is separably connected to the cleaner main body 10 and supplies commercially available power to the cleaner main body 10. The power cord 30 may include a plug 31 connected to an outlet, and a cord connector 32 connected to the cleaner main body 10. The cleaner main body 10 may include a main body connector 102 to which the cord connector 32 is connected.

The cleaner main body 10 may include a first body 101 and a second body 103 coupled to a lower side of the first body 101. The dust canister 110 may be separably coupled to the first body 101. The main body connector 102 may be provided at the first body 101. Wheels 105 may be coupled to both sides of the second body 103, respectively. The suction motor 160, the battery 120, and the charging device 140 may be installed in the second body 103. The suction motor 160 may be protected by a motor housing 162. The suction motor 160 may be accommodated in the motor housing 162. In this case, the battery 120 may be positioned lateral to the motor housing 162, i.e., lateral to the suction motor 160 to increase spatial efficiency.

The suction motor 160 and the battery 120 may be positioned between a plurality of wheels 105. The battery 120 may be positioned between one among the plurality of wheels 105 and the suction motor 160. The charging device 140 may be disposed to be spaced apart from the battery 120. In another example, the battery 120 may also be provided at the suction unit 21. However, in this case, the connection units 22, 23, and 24 may perform a function of transferring power of the battery 120 to the cleaner main body 10.

The battery 120 includes a plurality of battery cells. The plurality of battery cells may include a chargeable/dischargeable secondary battery. The plurality of battery cells may be connected in series. In the present disclosure, a maximum charging voltage (that is the sum of voltages of the plurality of battery cells) that may be charged in the battery 120 has a value that exceeds 42.4 V, in one example. For example, the maximum charging voltage of the battery 120 may be greater than or equal to 84.8 V.

The charging device 140 performs rectification and smoothing operations, receives a commercially available alternating current (AC) voltage, and converts the commercially available AC voltage into a direct current (DC) voltage. The charging device 140 supplies the converted DC voltage to the battery 120. For example, the charging device 140 converts 220 V or 110 V of commercially available AC voltage into a DC voltage that exceeds 42.4 V (drops a voltage) and supplies the converted DC voltage to the battery 120.

The charging device 140 may include a transformer 141 that transforms an input AC voltage, and an AC-DC converter 142 that converts an AC voltage output from the transformer 141 into a DC voltage. In this case, the DC voltage output from the AC-DC converter 142 may exceed 42.4 V.

In another example, the transformer 141 may transform the DC voltage output from the AC-DC converter 142. In this case, the DC voltage output from the transformer 141 may exceed 42.4 V.

In still another example, the charging device 140 may not include a transformer, and a circuit for preventing the DC voltage output from the AC-DC converter 142 from being transformed into an AC voltage may also be provided. That is, the AC-DC converter 142 may be an insulation type converter. In the current embodiment, an AC-DC converter having a well-known configuration may be used and thus, a detailed description thereof will be omitted.

In the current embodiment, the suction motor 160 may be, e.g., a brush-less direct current (BLDC) motor. A maximum output of the suction motor 160 may be greater than or equal to, e.g., 600W.

When a maximum charging voltage of the battery 120 is less than or equal to 42.4 V, a current is required to be greater than or equal to at least 14.15 A so that the suction motor 160 having a high output may be operated. Thus, a configuration of a circuit required to drive the suction motor 160 is complicated.

However, according to the current embodiment, since a maximum voltage charged in the battery 120 is greater than or equal to 84.8 V, a minimum current required to operate the suction motor 160 may be smaller than approximately 7.1 A. Thus, the configuration of the circuit required to drive the suction motor 160 is simplified.

According to the current embodiment, the DC voltage that exceeds 42.4 V is output from the charging device 140, and the maximum charging voltage of the battery 120 is greater than or equal to 84.8 V, allowing the suction motor 160 to have a high output. Thus, a suction force of the vacuum cleaner 1 may be increased so that cleaning performance may be improved.

The power cord 30 may be connected to the vacuum cleaner 1 only when the battery 120 is being charged, and when cleaning is performed using the vacuum cleaner 1, the power cord 30 may be separated from the vacuum cleaner 1 and may be advantageously used so that a degree of freedom of mobility of the vacuum cleaner 1 may be improved.

Since the vacuum cleaner 1 does not include a cord reel and receives power from the battery 120, a movement distance or mobility of the vacuum cleaner 1 is not limited, and while the vacuum cleaner 1 is moved, the vacuum cleaner 1 does not need to ride over a cord wound on the cord reel or to be moved while arranging the cord so that the vacuum cleaner 1 may be smoothly moved.

In the current embodiment, since the battery 120 is electrically connected to the main body connector 102 and the maximum charging voltage of the battery 120 is greater than or equal to 84.8 V, if no transformer 141 is provided, contacting the main body connector 102 may be dangerous to a user. However, in the current embodiment, since the charging device 140 includes the transformer 141, the transformer 141 serves as an insulator so that the user's safety may be improved.

The vacuum cleaner 1 may further include a battery management system (BMS) 130. The BMS 130 may detect a status of each of the plurality of battery cells and may transmit the result of detection to a controller 150. In one example, the BMS 130 may detect a voltage of each of the plurality of battery cells. The BMS 130 may maintain a uniform voltage between the plurality of battery cells when each of the plurality of battery cells is charged or discharged. That is, the BMS 130 may manage discharging of each of the plurality of battery cells so that power may be supplied to the suction motor 160 from each of the plurality of battery cells. The controller 150 may control the suction motor 160 and may control an operation of the suction motor 160 based on a voltage of the battery 120.

The vacuum cleaner 1 may further include a user interface 170. Operation instructions of the vacuum cleaner 1 may be input through the user interface 170, and the user interface 170 may display operation information or status information of the vacuum cleaner 1.

The user interface 170 may be provided at one or more of the handle 22 and the cleaner main body 10. The user interface 170 may be provided in a shape in which an input unit and a display unit are integrally formed, or may include an input unit and a display unit separately. The user interface 170 may include an informing unit from which a voice is output. Power on, a cleaning mode, and an intensity of the suction force of the vacuum cleaner 1 may be selected using the input unit. The display unit may display at least information regarding the remaining amount of the battery 120.

In one example, the intensity of the suction force may be set stepwise to strong (this being a case in which the suction force is the maximum), medium, and weak (this being a case in which the suction force is the minimum), and the intensity of the suction force of the suction motor 160 may be selected through the input unit. In the present specification, the intensity of the suction force has been described to be controlled in three steps. However, it will be noted that the number of steps for classifying the intensity of the suction force is not limited.

The controller 150 may determine a time of stopping the suction motor 160 based on the remaining amount of the battery 120. The controller 150 may control the display unit to display information regarding the necessity of charging of the battery 120 when the remaining amount of the battery 120 reaches a reference voltage. The reference voltage may be stored in a memory 180.

In another example, the display unit may display the remaining amount of the battery 120 continuously or stepwise. For example, the display unit may display the remaining amount of the battery 120 in the form of numbers, symbols or graphs. Alternatively, the display unit may include a plurality of light-emitting units and may display the remaining amount of the battery 120 by changing the number of turned on units among the plurality of light-emitting units. Alternatively, the display unit may display the remaining amount of the battery 120 by changing colors of lights irradiated from the plurality of light-emitting units.

Figure 4:
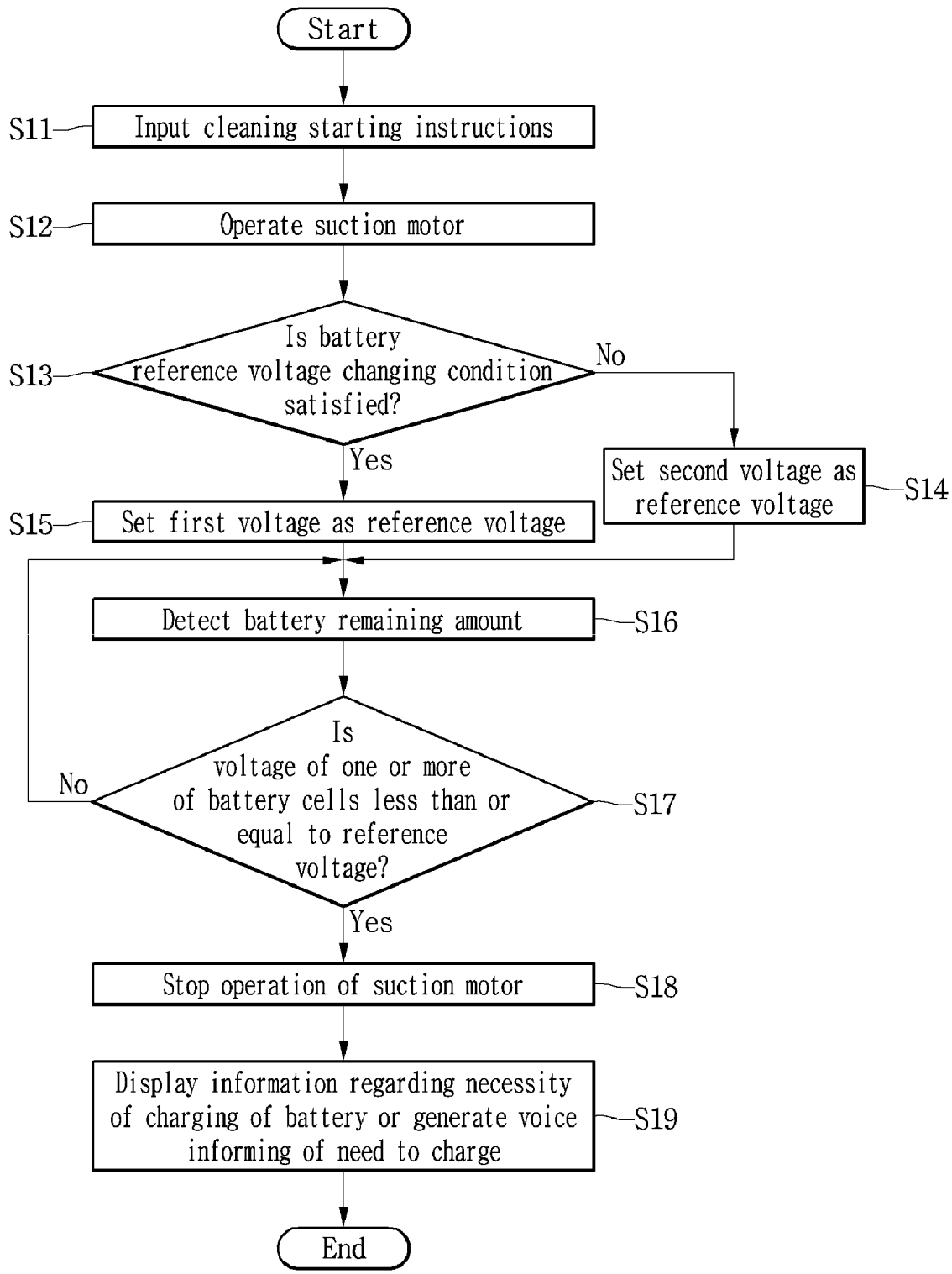
FIG. 4 is a flowchart illustrating a method of controlling a suction motor according to the number of times of battery usage according to an embodiment.

FIG. 4 is a view illustrating controlling of a suction motor according to the number of times of battery usage according to an embodiment. Cleaning starting instructions may be input through the user interface 170, and the intensity of the suction force of the suction motor 160 may be selected through the user interface 170 (S11). The controller 150 operates the suction motor 160 with the selected intensity of the suction force of the suction motor 160 (S12).

Power is supplied to the suction motor 160 from the battery 120. When the suction motor 160 operates, the controller 150 determines whether a condition on which a reference voltage of the battery 120 is changed, is satisfied (S13). In the present specification, the controller 150 may determine that the reference voltage changing condition is satisfied when the number of times of usage (the number of charging or discharging cycles) of the battery 120 exceeds a reference number. The number of times of usage of the battery 120 may be stored in the memory 180.

In another example, the controller 150 may determine that the reference voltage changing condition is satisfied when an accumulated usage time (for example, an accumulated discharging time) of the battery 120 exceeds a reference accumulated time. A discharging time when the battery 120 is discharged, may be accumulated and stored in the memory 180.

In still another example, the controller 150 may determine that the reference voltage changing condition is satisfied when a voltage reduction rate according to the discharging time is larger than a reference rate during discharging of the battery 120. In this case, the voltage reduction rate according to the discharging time of the battery 120 during the previous cleaning operation may be stored in the memory 180, and the controller 150 may compare the voltage reduction rate according to the discharging time of the battery 120 stored in the memory 180 with the reference rate.

In yet another example, the controller 150 may determine that the reference voltage changing condition of the battery 120 is satisfied when a voltage increase rate according to the charging time is smaller than the reference rate during charging of the battery 120. In this case, the voltage increase rate according to the charging time of the battery 120 during the previous battery charging operation may be stored in the memory 180, and the controller 150 may compare the voltage increase rate according to the charging time of the battery 120 stored in the memory 180 with the reference rate.

In yet another example, the controller 150 may determine that the reference voltage changing condition of the battery 120 is satisfied when a charging time during which a predetermined amount of current charges the battery 120 is longer than a reference charging time during charging of the battery 120. In this case, the charging time during which the predetermined amount of current charges the battery 120 during the previous battery charging operation is stored in the memory 180, and the controller 150 may compare the charging time when the predetermined amount of current of the battery 120 is charged stored in the memory 180 with the reference charging time.

In yet another example, the controller 150 may determine that the reference voltage changing condition of the battery 120 is satisfied when a one-time available time of the battery 120 is less than or equal to a reference usage time during discharging of the battery 120. In this case, the one-time available time of the battery 120 during the previous cleaning operation is stored in the memory 180, and the controller 150 may compare the available time of the battery 120 stored in the memory 180 with the reference usage time. Here, the available time of the battery 120 is a time required until a voltage of the battery 120 reaches a reference voltage (a first voltage).

As a result of the determination in operation S13, the controller 150 sets the first voltage as the reference voltage when the reference voltage changing condition of the battery 120 is not satisfied (S14). On the other hand, as a result of the determination in operation S13, the controller 150 sets a second voltage as the reference voltage when the reference voltage changing condition of the battery 120 is satisfied (S15).

In the current embodiment, the first voltage may be selected from a voltage that is 70% or more of a maximum voltage of each battery cell. For example, when the maximum voltage of each battery cell is 4.2 V, the first voltage may be greater than or equal to 2.94 V. The second voltage that is lower than the first voltage may be selected from a voltage that is 45% or more of the maximum voltage of each battery cell. For example, when the maximum voltage of each battery cell is 4.2 V, the second voltage may be greater than or equal to 1.89 V.

While the battery 120 is discharged, the remaining amount of the battery 120, i.e., a voltage of each of the plurality of battery cells is detected by the BMS 130, and the detected voltage is transmitted to the controller 150 (S16). The controller 150 determines whether a voltage of one or more of the plurality of battery cells is less than or equal to the reference voltage (S17).

As a result of the determination in operation S17, if the voltage of one or more of the plurality of battery cells is less than or equal to the reference voltage, the controller 150 may stop an operation of the suction motor 160 (S18). If the operation of the suction motor 160 is stopped, the display unit may display information regarding the necessity of charging of the battery 120, or the informing unit may generate a voice informing of the need to charge (S19). In another example, in the present specification, in operation S17, if a voltage of all of the battery cells is less than or equal to the reference voltage, the controller 150 may also stop the operation of the suction motor 160.

Even in this case, in FIG. 4, the first voltage may be selected from a voltage that is 70% or more of a maximum voltage of all of the battery cells. For example, when the maximum voltage of each battery cell is 4.2 V and the number of battery cells is N, the first voltage may be selected from a voltage that is greater than or equal to (4.2×N)×0.7 V. Further, the second voltage may be selected from a voltage that is 45% or more of the maximum voltage of all of the battery cells. For example, when the maximum voltage of each battery cell is 4.2 V and the number of battery cells is N, the second voltage may be selected from a voltage that is greater than or equal to (4.2×N)×0.45 V.

Figure 5:
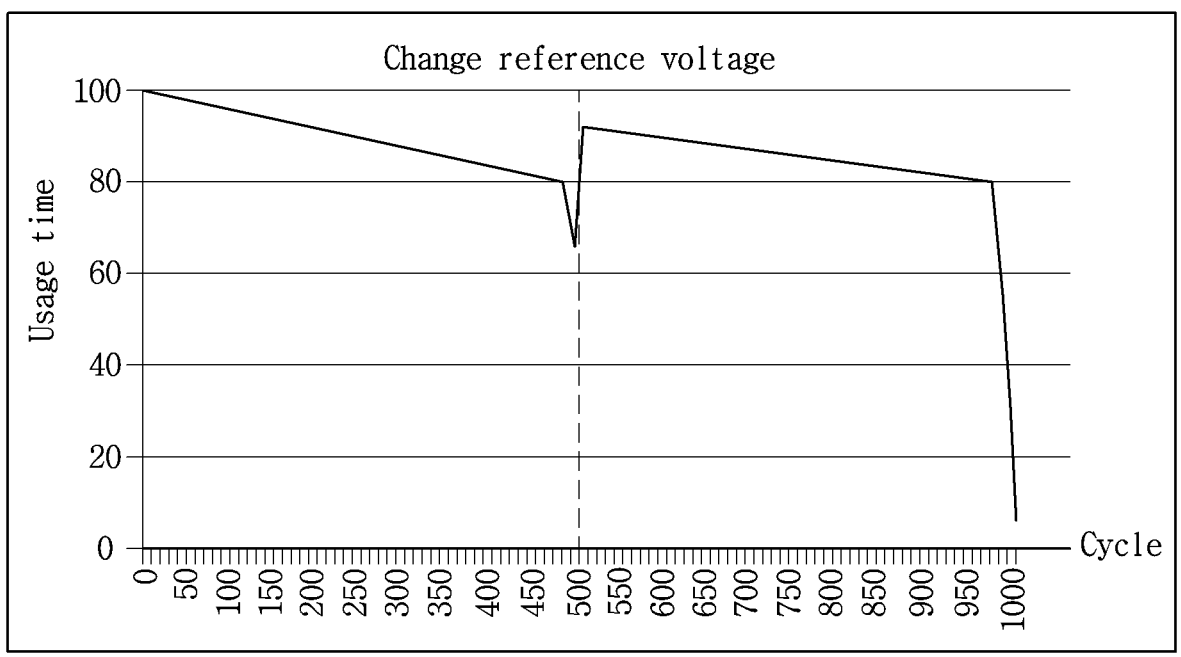
FIG. 5 is a view illustrating an available time of the suction motor according to the number of times of battery usage.

FIG. 5 is a view illustrating an available time of the suction motor according to the number of times of battery usage. The vertical axis represents a usage time ratio and a usage time of a battery when an available time of the battery as a new product is 100, and the horizontal axis represents the number of times of battery usage (the number of battery charging cycles). As the number of times of battery usage is increased, the battery available time when the battery is used in a state in which the battery is fully charged, is reduced.

By changing the reference voltage for determining the time of stopping the operation of the suction motor from the first voltage into the second voltage, i.e., by reducing the reference voltage, the battery available time when the battery is used in the state in which the battery is fully charged, may be increased compared to a case in which the reference voltage is not changed. As the battery available time is increased, the lifetime of the battery may be increased approximately 2-fold.

Figure 6:
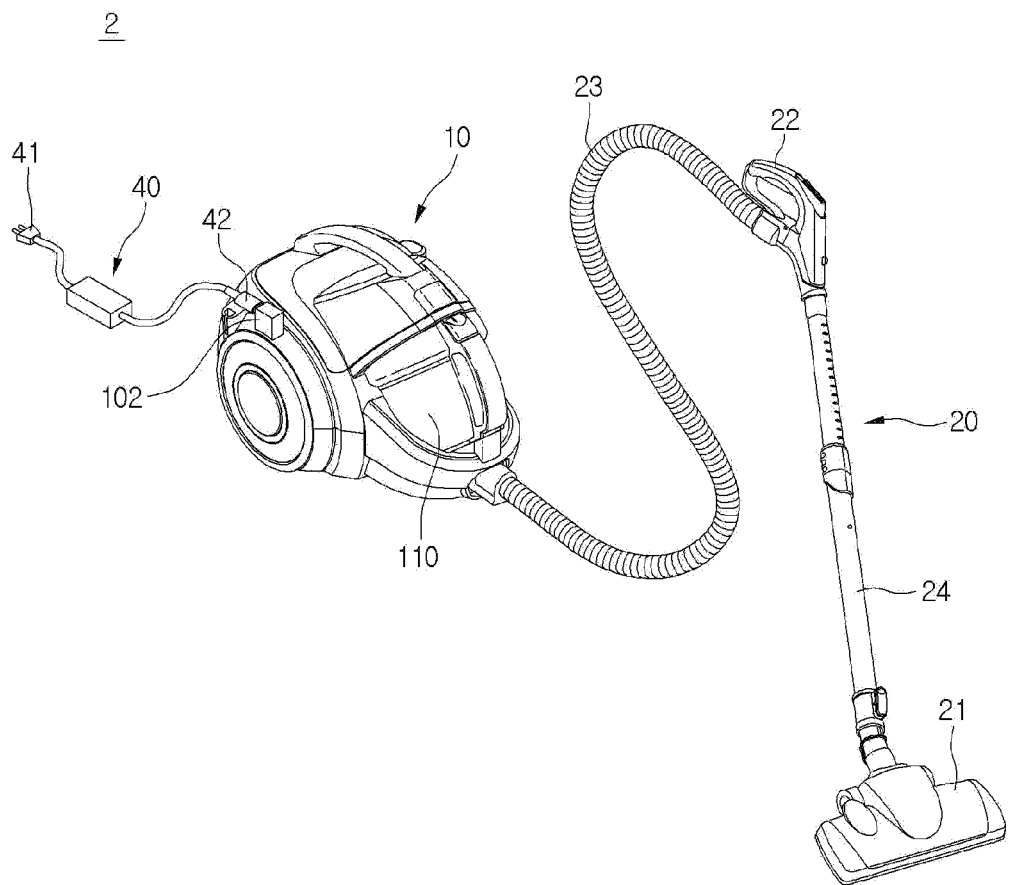
FIG. 6 is a perspective view of a vacuum cleaner according to another embodiment.
Figure 7:
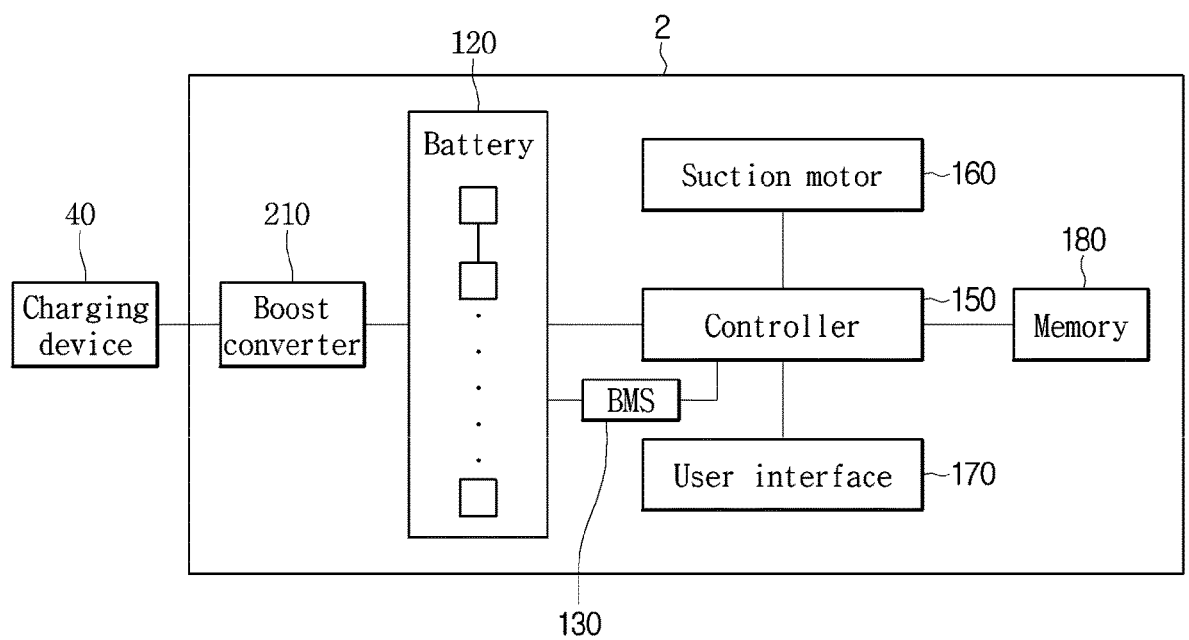
FIG. 7 is a block diagram of a configuration of the vacuum cleaner illustrated in FIG. 6.

FIG. 6 is a perspective view of a vacuum cleaner according to another embodiment, and FIG. 7 is a block diagram of a configuration of the vacuum cleaner illustrated in FIG. 6. The other portions of the current embodiment are the same as those of the previous embodiment except that a charging device is separably connected to the vacuum cleaner. Thus, hereinafter, only characteristic portions of the current embodiment will be described.

A vacuum cleaner 2 according to the current embodiment may further include a cleaner main body 10 and a charging device 40 that is separably connected to the cleaner main body 10 and performs charging of the battery 120. The charging device 40 may include a power cord 41 connected to an outlet and a charging device connector 42 connected to the cleaner main body 10. The cleaner main body 10 may include a main body connector 102 to which the charging device connector 42 is connected.

The charging device 40 performs rectification and smoothing operations, receives a commercially available AC voltage, and converts the commercially available AC voltage into a DC voltage. The charging device 40 supplies the converted DC voltage to the cleaner main body 10. For example, the charging device 40 converts 220 V of commercially available AC voltage into a DC voltage that is less than or equal to 42.4 V (drops a voltage) and supplies the converted DC voltage to the cleaner main body 10.

Since the DC voltage that is less than or equal to 42.4 V is output from the charging device connector 42 of the charging device 40, there is no problem in the user's safety even when no insulating device is provided at the charging device connector 42. Of course, an insulating device may be provided at the charging device connector 42. In the current embodiment, in order to operate the suction motor 160 having a high output by using a voltage charged in the battery 120, the cleaner main body 10 may further include a boosting device that boosts a voltage by receiving the DC voltage that is less than or equal to 42.4 V from the charging device 40.

In FIG. 7, a boost converter 210 is used as an example of the boosting device. However, it will be noted that, in the current embodiment, a configuration of the boosting device is not limited. In the current embodiment, the DC voltage that is less than or equal to 42.4 V input to the boost converter 210 is boosted by two times or more so that a voltage that is greater than or equal to 84.8 V may be charged in the battery 120.

The boost converter 210 may include an inductor, a diode, a capacitor, and a switching element. The switching element is repeatedly turned on/off at a high speed by control of the controller 150 so that the boost converter 210 may boost an input voltage. The switching element may be configured of a metal oxide semiconductor field effect transistor (MOSFET). However, embodiments of the present disclosure are not limited thereto, and the switching element may also be configured of a bipolar junction transistor (BJT) or an insulated gate bipolar transistor (IGBT).

In another example, a transformer may be additionally provided between the boosting device and the battery 120. If no transformer is provided, the main body connector 102 may be insulated, and if the transformer is provided, the transformer serves as an insulating device. Thus, the main body connector 102 may not be insulated.

As described above, the reference voltage is set to two steps. However, the reference voltage may also be set to three or more steps. One or more third voltages having a value between the first voltage and the second voltage may also be set as the reference voltage.

As described above, a canister type cleaner has been described as a cleaner. However, the teachings of the present disclosure may be applied to an upright type cleaner. In such a case, a battery that supplies power to a suction motor may be provided at a suction unit or a cleaner main body. The above-described charging device or power cord may also be provided at the suction unit or the cleaner main body.

The present disclosure provides to a vacuum cleaner capable of being conveniently moved. The present disclosure provides a vacuum cleaner in which a lifetime of a battery is extended.

According to the present disclosure, a vacuum cleaner may include a cleaner main body including a suction motor for generating a suction force; a suction unit that is in communication with the cleaner main body and sucks air and dust; a battery that supplies power to the suction motor; a battery management system (BMS) that detects a status of the battery; and a controller that controls an operation of the suction motor, wherein, if a voltage of the battery detected by the BMS reaches a reference voltage, the controller may stop the suction motor, and the reference voltage is changeable.

According to the present disclosure, a vacuum cleaner may include a cleaner main body including a suction motor for generating a suction force; a suction unit that is in communication with the cleaner main body and sucks air and dust; a battery that supplies power to the suction motor and includes a plurality of battery cells; a battery management system (BMS) that detects a status of the battery; and a controller that controls an operation of the suction motor, wherein, if a voltage of all of the plurality of battery cells detected by the BMS reaches a reference voltage, the controller may stop the suction motor, and when the number of times of usage of the battery is increased, the reference voltage may be reduced.

According to the present disclosure, a vacuum cleaner may include a cleaner main body including a suction motor for generating a suction force; a suction unit that is in communication with the cleaner main body and sucks air and dust; a battery that supplies power to the suction motor and includes a plurality of battery cells; a battery management system (BMS) that detects a status of the battery; and a controller that controls an operation of the suction motor, wherein, if a voltage of one or more of the plurality of battery cells detected by the BMS reaches a reference voltage, the controller may stop the suction motor, and when the number of times of usage of the battery is increased, the reference voltage may be reduced.

In the description of embodiments, terms such as "first," "second," "A," "B," "(a)," "(b)" or the like may be used herein when describing components of the present disclosure. Each of these terms is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

The present disclosure is related to U.S. application Ser. No. 14/852,331) and Ser. No. 14/852,359, both filed on Sep. 11, 2015, whose entire disclosures are incorporated herein by reference.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A vacuum cleaner comprising:
a cleaner main body having a motor that generates a suction force;
a suction unit that is in communication with the cleaner main body and sucks air and dust based on the suction force;
a battery that supplies power to the motor;
a battery management system (BMS) that detects a status of the battery; and
a controller that controls an operation of the motor,
wherein, when the motor is operating based on power supplied from the battery, the motor is stopped when a voltage of the battery detected by the BMS changes to be less than a reference voltage, and the reference voltage is changed based on a condition of the battery,
wherein when the condition of the battery changes, the reference voltage at which an operation of the motor is stopped is changed from a first voltage to a second voltage that is lower than the first voltage,
wherein the condition of the battery changes when a number of times of usage of the battery is increased,
wherein the battery comprises a plurality of battery cells and the first voltage is a voltage that is 75% or more of a voltage of all of the battery cells or a voltage that is 75% or more of a maximum voltage of each of the plurality of battery cells,
wherein the second voltage is a voltage that is 45% or more of the voltage of all of the battery cells or a voltage that is 45% or more of the maximum voltage of each of the plurality of battery cells,
wherein a maximum output of the motor is greater than or equal to 600 W,
wherein a maximum charging voltage of the battery is greater than or equal to 84.8V, and
wherein a minimum current to operate the motor is less than 7.1 A.

2. The vacuum cleaner according to claim 1, wherein the battery comprises a plurality of battery cells, and the BMS manages discharging of each of the plurality of battery cells so that power is supplied to the motor from each of the plurality of battery cells.

3. The vacuum cleaner according to claim 2, wherein the BMS detects a respective voltage of each of the plurality of battery cells, and the motor is stopped when the voltage of any of the plurality of battery cells is less than or equal to the reference voltage.

4. The vacuum cleaner according to claim 2, wherein the BMS detects a respective voltage of each of the plurality of battery cells, and the motor is stopped when the voltage of each of the plurality of battery cells is less than or equal to the reference voltage.

5. The vacuum cleaner according to claim 1, wherein the reference voltage is changed when the number of times of usage of the battery exceeds a reference number.

6. The vacuum cleaner according to claim 1, wherein the reference voltage is changed when an accumulated usage time of the battery exceeds a reference accumulated time.

7. The vacuum cleaner according to claim 1, wherein the reference voltage is changed when a voltage reduction rate according to a discharging time is larger than a reference rate for discharging of the battery.

8. The vacuum cleaner according to claim 1, wherein the reference voltage is changed when a voltage increase rate according to a charging time is smaller than a reference rate for charging of the battery.

9. The vacuum cleaner according to claim 1, wherein the reference voltage is changed when a charging time during which a predetermined amount of current charges the battery is longer than a reference charging time for charging of the battery.

10. The vacuum cleaner according to claim 1, wherein the reference voltage is changed when a one-time available time of the battery is less than or equal to a reference usage time for discharging of the battery.

11. The vacuum cleaner according to claim 1, further comprising:
a charging device separably connected to the cleaner main body and that charges the battery; and
a boosting device that boosts a voltage output from the charging device and supplies the boosted voltage to the battery.

12. The vacuum cleaner according to claim 1, further comprising:
a charging device provided in the cleaner main body and configured to charge the battery; and
a power cord separably connected to the cleaner main body and that supplies external power to the charging device.

13. The vacuum cleaner according to claim 1, further comprising a display unit that displays information to charge the battery, or an informing unit from which a voice is output, when the motor is stopped.

* * * * *